(12) United States Patent
Lin et al.

(10) Patent No.: US 11,771,133 B2
(45) Date of Patent: Oct. 3, 2023

(54) MOISTURE-PROOF ELECTRONIC CIGARETTE

(71) Applicant: SHENZHEN HAPPY VAPING TECHNOLOGY LIMITED, Guangdong (CN)

(72) Inventors: Guangrong Lin, Guangdong (CN); Xianbin Zheng, Guangdong (CN)

(73) Assignee: SHENZHEN HAPPY VAPING TECHNOLOGY LIMITED, Shenzhen (CN)

( * ) Notice: Subject to any disclaimer, the term of this patent is extended or adjusted under 35 U.S.C. 154(b) by 1099 days.

(21) Appl. No.: 16/482,261

(22) PCT Filed: Dec. 1, 2017

(86) PCT No.: PCT/CN2017/114311
§ 371 (c)(1),
(2) Date: Jul. 31, 2019

(87) PCT Pub. No.: WO2018/157638
PCT Pub. Date: Sep. 7, 2018

(65) Prior Publication Data
US 2019/0387800 A1 Dec. 26, 2019

(30) Foreign Application Priority Data
Feb. 28, 2017 (CN) .......................... 201710113603.6

(51) Int. Cl.
*A24F 40/485* (2020.01)
*A24F 40/10* (2020.01)
(Continued)

(52) U.S. Cl.
CPC .......... *A24F 40/485* (2020.01); *B67D 7/0288* (2013.01); *F16J 15/06* (2013.01);
(Continued)

(58) Field of Classification Search
CPC .......... A24F 40/10; A24F 40/40; A24F 40/42; A24F 40/485
See application file for complete search history.

(56) References Cited

U.S. PATENT DOCUMENTS 11,051,550 B2 * 7/2021 Lin ........................ A24F 40/485
2019/0297952 A1 * 10/2019 Qiu ........................ A24F 40/48
(Continued)

*Primary Examiner* — Hae Moon Hyeon

(57) ABSTRACT

A moisture-proof electric cigarette including a detachably connected vaporizer and battery assembly; the vaporizer includes a housing and a vaporizing device; a liquid storage chamber and a liquid absorbing chamber are provided in the vaporizer, and a vapor outlet passage and an air inlet passage are provided in the housing; an air inlet chamber provided in the vaporizing device communicates with the air inlet passage; a liquid guiding strip with a heating coil wound around the middle thereof is suspendedly disposed inside the vaporizing chamber, and both ends of the liquid guiding strip stretch into the liquid absorbing chamber and guide the e-cigarette liquid to the heating coil for heating and vaporizing; first positive and negative electrodes isolated from the air inlet chamber arranged at the bottom of the vaporizing device abut against second positive and negative electrodes in the receiving opening of the battery assembly respectively.

18 Claims, 10 Drawing Sheets

(51) Int. Cl.
*A24F 40/40* (2020.01)
*B67D 7/02* (2010.01)
*F16J 15/06* (2006.01)
*H05B 3/44* (2006.01)
*H01M 50/213* (2021.01)
*A24F 15/015* (2020.01)

(52) U.S. Cl.
CPC ............ H01M 50/213 (2021.01); H05B 3/44 (2013.01); *A24F 15/015* (2020.01); *A24F 40/10* (2020.01); *H01M 2220/30* (2013.01)

(56) References Cited

U.S. PATENT DOCUMENTS

2019/0364972 A1* 12/2019 Lin ..................... A24F 40/485
2020/0260794 A1* 8/2020 Angell .................... D02G 3/44
2020/0376210 A1* 12/2020 Simpson ................ A24F 40/50

* cited by examiner

MOISTURE-PROOF ELECTRONIC CIGARETTE

FIELD OF THE INVENTION

The present invention relates to the technical field of electronic cigarettes, more particularly to a moisture-proof electronic cigarette.

BACKGROUND OF THE INVENTION

A detachable electronic cigarette usually comprises a vaporizer and a battery assembly, wherein a liquid storage chamber for storing the e-cigarette liquid is provided in the vaporizer, and a vaporizing device for heating and vaporizing the e-cigarette liquid is arranged.

In an existing electronic cigarette, a passage configured for removing the moisture is arranged in a center of a vaporizer. However, as an air inlet passage is vertically arranged at a bottom of the vaporizer, whilst positive and negative electrodes of the vaporizer are not sealed, vapor produced from smoking is easy to flow back through an air inlet passage and a gap formed within the positive and negative electrodes and into a receiving opening of a battery assembly connecting to the vaporizer, thus making the moisture in the vapor easy to be condensed on the receiving opening of the battery assembly, even flow into the battery assembly, in such a case, short circuit of the electrodes or corrosion of the circuits will be caused, therefore giving rise to malfunction of the electronic cigarette and affecting user experience.

SUMMARY OF THE INVENTION

The present invention aims to provide a moisture-proof electronic cigarette, whose structure is adjusted and improved, for example, the air inlet passage is not in vertical communication with the vaporizing chamber and the vapor outlet tube, and an air inlet chamber is added, so that the vapor produced from smoking is not easy to flow back, or even the vapor flows back, the moisture in the vapor will be condensed in the air inlet chamber, therefore preventing the moisture from flowing back and being condensed in the receiving opening of the battery assembly.

To this end, the present invention provides a technical solution as follows. A moisture-proof electronic cigarette comprises a detachably connected vaporizer and battery assembly, wherein the vaporizer comprises a housing and a vaporizing device.

A mouthpiece is arranged in a center of an upper end surface of the housing, and a lower end of the housing is an opening end. A vapor outlet tube extending inside the housing from the mouthpiece is arranged. At least one air inlet passage is formed inside a wall of the housing in an upward direction from the opening end. A first air inlet is provided on an outer wall of the housing and is in communication with an upper portion of the air inlet passage, while a second air inlet is provided on the inner wall of the housing and is in communication with a lower portion of the air inlet passage. The diameter of a section of the outer wall of the housing adjacent to the opening end decreases, thus forming a plug-in section. One end of the battery assembly is provided with a receiving opening for accommodating and receiving the plug-in section.

The vaporizing device is disposed in the housing at one side where the opening end is formed. A vaporizing chamber is formed in the center of the vaporizing device, and a liquid absorbing chamber surrounds the vaporizing chamber. An air inlet chamber is formed at the bottom of the vaporizing device. A liquid storage chamber for storing the e-cigarette liquid is defined between the inner wall of the housing, the outer wall of the vapor outlet tube and an upper side of the vaporizing device. The liquid storage chamber is in communication with the liquid absorbing chamber. An upper part of the vaporizing chamber is in communication with the vapor outlet tube, while a lower part of the vaporizing chamber is in communication with the air inlet chamber. The air inlet chamber is in communication with the air inlet passage through the second air inlet. The liquid storage chamber and the liquid absorbing chamber are both isolated and sealed from the vapor outlet tube, the vaporizing chamber, the air inlet chamber and the air inlet passage.

A liquid guiding strip is suspendedly disposed inside the vaporizing chamber, wherein a heating coil wound around the middle of the liquid guiding strip, and both ends of the liquid guiding strip stretch into the liquid absorbing chamber. The e-cigarette liquid in the liquid absorbing chamber is absorbed by the liquid guiding strip and guided to the heating coil to be heated and vaporized, thus producing vapor of the e-cigarette in the vaporizing chamber.

First positive and negative electrodes isolated from the air inlet chamber are arranged at the bottom of the vaporizing device. When the plug-in section is plugged in the receiving opening of the battery assembly, the first positive and negative electrodes and second positive and negative electrodes in the receiving opening of the battery assembly respectively abut against each other and electric connection is therefore achieved.

Preferably, the vaporizing device further comprises a vaporizing base, a throttle lid, a sealing sleeve, a connecting sleeve and an electrode base. An outer wall of the vaporizing base suitably abuts against the inner wall of the lower portion of the housing. A cylinder extending downward is arranged at the center of the vaporizing base, a fourth air inlet is provided at the bottom of the cylinder, an annular cavity surrounds the cylinder, and a pair of grooves for suspending the liquid guiding strip extending downward are symmetrically provided at an upper end of the wall of the cylinder. The throttle lid fits over the upper end surface of the vaporizing base. The throttle lid is provided with a center hole, and throttle orifices are provided around the center hole. The center hole is in communication with the cylinder, while the throttle orifices are in communication with the annular cavity of the vaporizing base. The sealing sleeve tightly abuts against the outer wall and the end surface of the lower portion of the vapor outlet tube. A lower end surface of the sealing sleeve abuts against an upper end surface of the wall of the cylinder. An upper inner wall of the connecting sleeve is tightly sleeved at the outer wall of the sealing sleeve, a lower outer wall of the connecting sleeve is tightly sleeved in an inner wall of the center hole of the throttle lid, and a lower inner wall of the connecting sleeve is tightly sleeved at an outer wall of the cylinder. The wall of the connecting sleeve is provided with inverted U-shaped notches at positions corresponding to the grooves placing the liquid guiding strip, through which the liquid guiding strip can extend. The electrode base is provided with a bottom plate whose shape is the same as the end surface of the opening end of the housing. The first positive and negative electrodes pass through the bottom plate, and a vertical wall is vertically disposed around the bottom plate, wherein the vertical wall abuts against the bottom of the vaporizing base. Two protruding columns are arranged at the bottom of the vaporizing base, and lower end surfaces of the protruding columns abut against the bottom plate of the electrode base. Chambers for accommodating the first positive and negative electrodes are formed in the centers of the protruding columns. A vaporizing chamber is defined between the bottom of the sealing sleeve, the inner wall of the cylinder and the bottom of the cylinder, a liquid absorbing chamber is defined between the throttle lid and the annular cavity of the vaporizing base, and an air inlet chamber is defined between the bottom plate of the electrode base, the vertical wall of the electrode base and the bottom of the vaporizing base. A third air inlet is inwardly recessed into the lower end of the outer wall of the vaporizing base at a position facing the second air inlet, wherein the third air inlet is in communication with the air inlet chamber.

Preferably, the grooves of the cylinder are in U-shaped. A step for placing the liquid guiding strip extending from the bottom of the groove towards the annular cavity is arranged. Positioning notches are provided at an end surface of the outer periphery of the vaporizing base. A sealing plate for sealing the grooves of the cylinder extending vertically downward along the wall of the center hole is arranged at the throttle lid at a position corresponding to the step. Upper grooves are provided at the bottom end surface of the sealing plate and correspond to the positions where the liquid guiding strip is placed, allowing the liquid guiding strip to extend. Positioning protrusions suitably abutting against the positioning notches extending downward are disposed at the throttle lid at positions corresponding to the positioning notches. Side plates adjacent to inner sides of the positioning protrusions extending downward from the wall of the center hole are arranged and insert into the annular cavity.

Preferably, the bottom of the vaporizing base is provided with an annular contacting surface at a position connecting with the upper end surface of the vertical wall. A platform protrudes downwardly from the inner side of the annular contacting surface. A transitional slope is formed between the surface of the platform and the annular contacting surface. The upper end surface of the vertical wall of the electrode base tightly presses against the transitional slope. An annular groove is further provided on the platform at an inner side adjacent to the transitional slope. A trapezoidal protruding ring is formed between the annular groove and the annular contacting surface.

Preferably, the sealing sleeve is made of soft and high-temperature resistant material such as silica gel, and a plurality of protruding rings of the sealing sleeve surrounding the inner wall or the outer wall of the sealing sleeve are disposed to increase sealing performance.

Preferably, a liquid refilling hole is further provided at the bottom of the vaporizing base, and a plunger is arranged at the bottom plate of the electrode base at a position corresponding to the liquid refilling hole, wherein the plunger is configured for being inserted into the liquid refilling hole and blocking the liquid refilling hole.

Preferably, first male snaps are formed on the outer side of the vertical wall of the electrode base, while first snap-in holes correspondingly snap-fitted to the first male snaps are formed on the inner wall of the plug-in section.

Preferably, second male snaps are formed on the outer wall of the plug-in section, while second snap-in holes are formed on the inner wall of the receiving opening of the battery assembly correspondingly snap-fitted to the second male snaps.

Preferably, the first air inlet is disposed on a side wall of the plug-in section, and an outer wall of the receiving opening of the battery assembly is provided with the outer air inlet at a position corresponding to the first air inlet.

Preferably, the cross section of the housing is oval-shaped and gradually increases from top to bottom, and the cross section of the battery assembly is oval-shaped as well.

As for the moisture-proof electronic cigarette of the present disclosures, an air inlet chamber is disposed at the bottom of the vaporizing base, an air inlet passage is provided in the wall of the housing of the vaporizer, and the protruding columns and the chambers are arranged to seal the first positive and negative electrodes, with these structures, when the user smokes, if the vapor flows back, the vapor is buffered in the air inlet chamber, and the moisture in the vapor is condensed within the air inlet chamber. Leaking or non-vaporized e-cigarette liquid can be gathered in the air inlet chamber as well, thus preventing the moisture and water droplets from flowing into the receiving opening of the battery assembly through the gap between the air inlet passage and the first positive and negative electrodes, thereby not only avoiding short circuit of the electrodes or corrosion of the circuits caused by the moisture or malfunction of the electronic cigarette, but also preventing user experience from being affected by the droplets stored in the receiving opening of the battery assembly, when the user disconnects the vaporizer and battery assembly. Moreover, the grooves of the cylinder, the step and the sealing plate of the throttle lid are firmly assembled, which avoids a gap between the liquid guiding strip and the grooves, and thereby reduces leakage of the e-cigarette liquid. The structures of the air inlet chamber and the air inlet passage make it possible that more e-cigarette liquid can be guided to the heating coil for being heated and vaporized by a relatively strong suction in the vaporizing chamber applied by the user, therefore producing more vapor and improving user experience.

Figure 1:
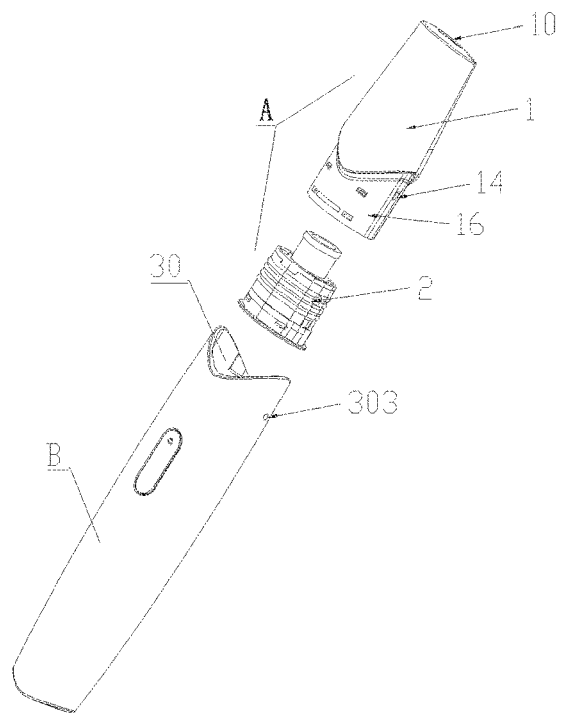
FIG. 1 is an exploded view of an electronic cigarette of an embodiment of the present invention.

Herein, reference numerals of main components are as follows:

A. vaporizer; B. battery assembly; 1. housing; 10. mouthpiece; 11. opening end; 12. vapor outlet tube; 13. air inlet passage; 14. first air inlet; 15. second air inlet; 16. plug-in section; 160. first snap-in hole; 161. second male snap; 17. liquid storage chamber; 18. inner tube; 2. vaporizing device; 21. vaporizing chamber; 211. liquid guiding strip; 212. heating coil; 22. liquid absorbing chamber; 23. air inlet chamber; 24. vaporizing base; 240. liquid refilling hole; 241. cylinder; 2410. groove; 242. fourth air inlet; 243. annular cavity; 2430. step; 244. upper end surface of the vaporizing base; 245. bottom of the vaporizing base; 2451. annular contacting surface; 2452. transitional slope; 2453. platform; 2454. annular groove; 2455. trapezoidal protruding ring; 246. protruding column; 2460. chamber; 247. third air inlet; 248. positioning notch; 249. protruding ring of the vaporizing base; 25. throttle lid; 251. center hole; 252. throttle orifice; 253. sealing plate; 2530. upper groove; 254. positioning protrusion; 255. side plate; 26. sealing sleeve; 260. protruding ring of the sealing sleeve; 261. bottom hole; 27. connecting sleeve; 270. inverted U-shaped notch; 28. electrode base; 280. bottom plate; 281. first positive and negative electrodes; 282. vertical wall; 2821. first male snap; 283. plunger; 30. receiving opening; 301. second positive and negative electrodes; 302. second snap-in hole; 303. outer air inlet; 304. battery.

DETAILED DESCRIPTION OF ILLUSTRATED EMBODIMENTS

In order to make purposes, technical solutions and advantages of the present disclosures clearer, the present disclosures will be further explained in detail with reference to figures and embodiments described hereinafter.

For convenience of description, the moisture-proof electronic cigarette of the present disclosures is described hereinafter in a condition that the moisture-proof electronic cigarette is vertically disposed with its mouthpiece 10 facing upward, as shown in FIG. 1. It should be understood that, as used herein, the expresses such as upper, lower, top, bottom, upper end, lower end, upper side and lower side, upward and downward are intended to indicate orientation and position relationships in a condition that the moisture-proof electronic cigarette is vertically disposed with its mouthpiece facing upward.

As shown in FIG. 1, a moisture-proof electronic cigarette of the present disclosures comprises a detachably connected vaporizer A and battery assembly B, wherein the vaporizer A comprises a housing 1 and a vaporizing device 2. The vaporizing device 2 is arranged in the housing 1. A mouthpiece 10 is arranged in a center of an upper end surface of the housing 1. An upper portion of the housing 1 forms a mouthpiece end. The user can inhale vapor of the e-cigarette liquid by keeping the mouthpiece 10 in the mouth and sucking it.

Figure 3:
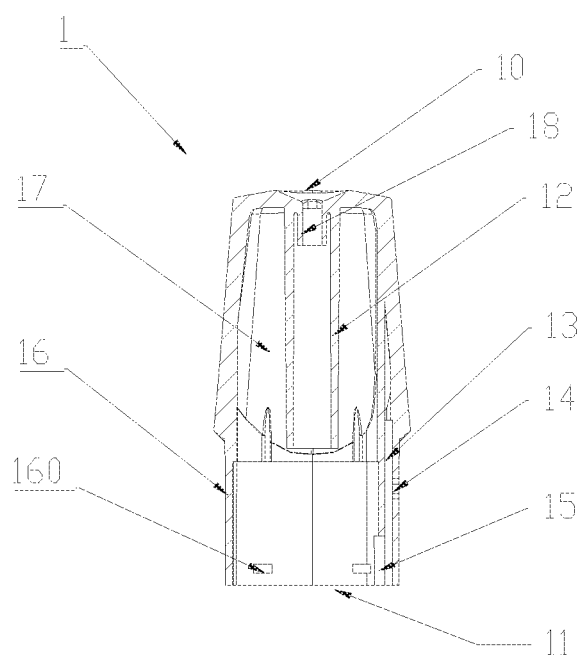
FIG. 3 is a front sectional view of a housing of the embodiment of the present invention.
Figure 4:
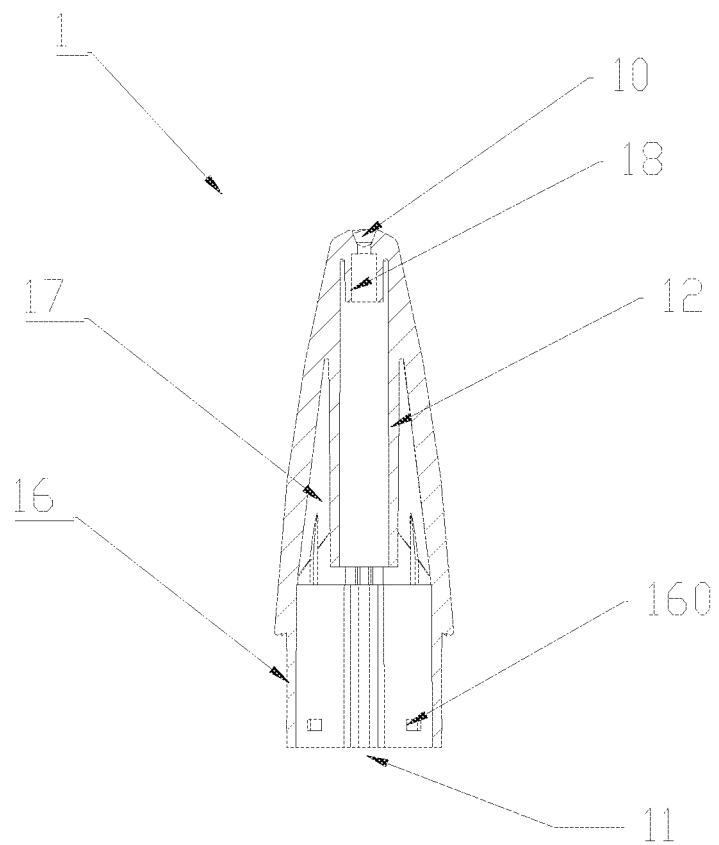
FIG. 4 is a sectional side view of the housing of the embodiment of the present invention.

As shown in FIGS. 3 and 4, a lower end of the housing 1 is an opening end 11. A vapor outlet tube 12 extending inside the housing 1 from the mouthpiece 10 is arranged. In the present embodiment of the present disclosures, an inner tube 18 in a small length is arranged inside the vapor outlet tube 12 at an end adjacent to the mouthpiece 10, and a collecting groove (not shown in the figure) for collecting condensed small droplets or water droplets on the inner wall of the vapor outlet tube 12 is formed between an outer wall of the inner tube 18 and the inner wall of the vapor outlet tube 12. At least one air inlet passage 13 is formed inside a wall of the housing 1 in an upward direction from the opening end 11. A first air inlet 14 is provided on an outer wall of the housing 1 and is in communication with an upper portion of the air inlet passage 13, while a second air inlet 15 is provided on the inner wall of the housing 1 and is in communication with a lower portion of the air inlet passage 13. The diameter of a section of the outer wall of the housing 1 adjacent to the opening end decreases, thus forming a plug-in section 16.

Figure 2:
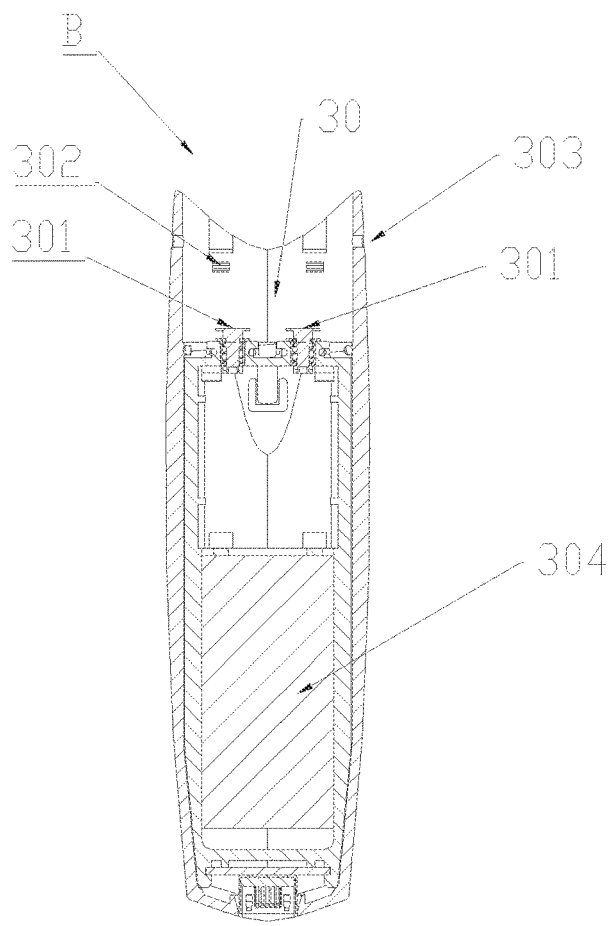
FIG. 2 is a sectional view of a battery assembly of the embodiment of the present invention.

As shown in FIGS. 1 and 2, a battery 304 for supplying power is mounted inside the battery assembly B. One end of the battery assembly B is provided with a receiving opening 30 for accommodating and receiving the plug-in section 16.

As shown in FIGS. 3 to 7, the vaporizing device 2 is disposed in the housing 1 at one side where the opening end 11 is formed. A vaporizing chamber 21 is formed in the center of the vaporizing device 2, and a liquid absorbing chamber 22 surrounds the vaporizing chamber 21. An air inlet chamber 23 is formed at the bottom of the vaporizing device. A liquid storage chamber 17 for storing the e-cigarette liquid is defined between the inner wall of the housing 1, the outer wall of the vapor outlet tube 12 and an upper side of the vaporizing device. The liquid storage chamber 17 is in communication with the liquid absorbing chamber 22. An upper part of the vaporizing chamber 21 is in communication with the vapor outlet tube 12, while a lower part of the vaporizing chamber 21 is in communication with the air inlet chamber 23. The air inlet chamber 23 is in communication with the air inlet passage 13 through the second air inlet 15. The liquid storage chamber 17 and the liquid absorbing chamber 22 are both isolated and sealed from the vapor outlet tube 12, the vaporizing chamber 21, the air inlet chamber 23 and the air inlet passage 13. A liquid guiding strip 211 is suspendedly disposed inside the vaporizing chamber, wherein a heating coil 212 wound around the middle of the liquid guiding strip 211, and both ends of the liquid guiding strip 211 stretch into the liquid absorbing chamber 22. When the electronic cigarette is working, the e-cigarette liquid in the liquid absorbing chamber 22 is absorbed by the liquid guiding strip 211 and guided to the heating coil 212 to be heated and vaporized, thus producing vapor of the e-cigarette in the vaporizing chamber 21.

Figure 5:
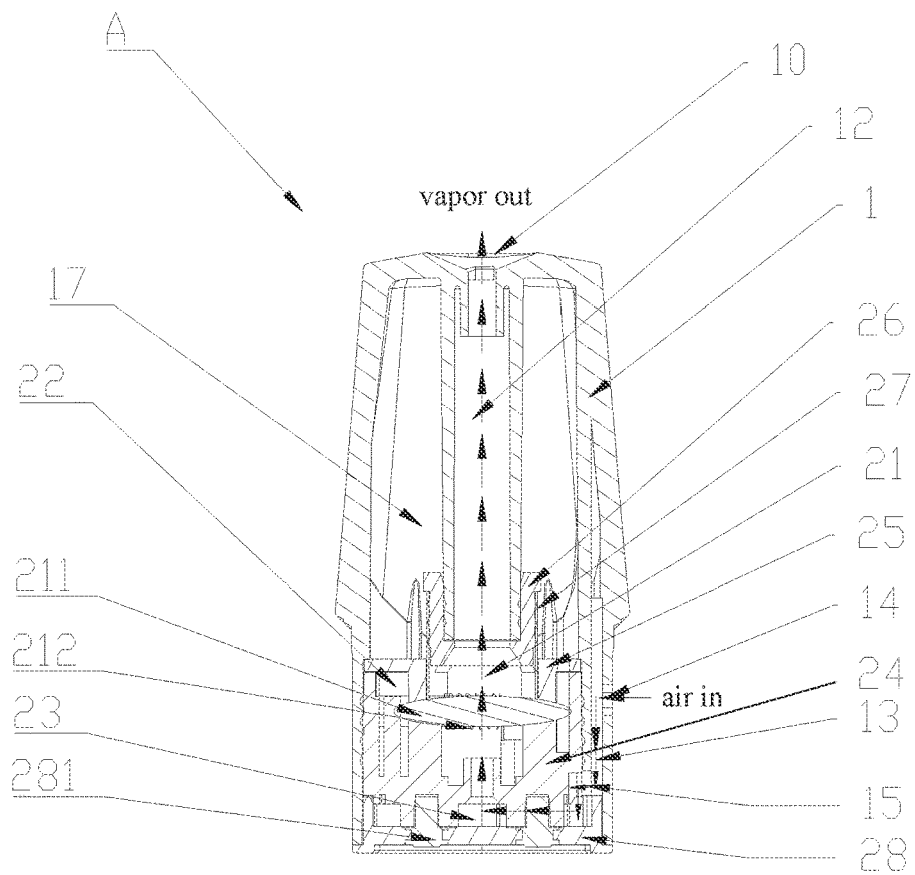
FIG. 5 is a front sectional view of a vaporizer of the embodiment of the present invention.

As shown in FIGS. 1, 2 and 5, first positive and negative electrodes 281 isolated from the air inlet chamber 23 are arranged at the bottom of the vaporizing device 2. When the plug-in section 16 is plugged in the receiving opening 30 of the battery assembly, the first positive and negative electrodes 281 and second positive and negative electrodes 301 in the receiving opening 30 of the battery assembly respectively abut against each other and electric connection is therefore achieved. In such a way, the battery 304 mounted in the battery assembly B can provide the heating coil 212 in the vaporizer A with power through the second positive and negative electrodes 301 and the first positive and negative electrodes 281.

Figure 7:
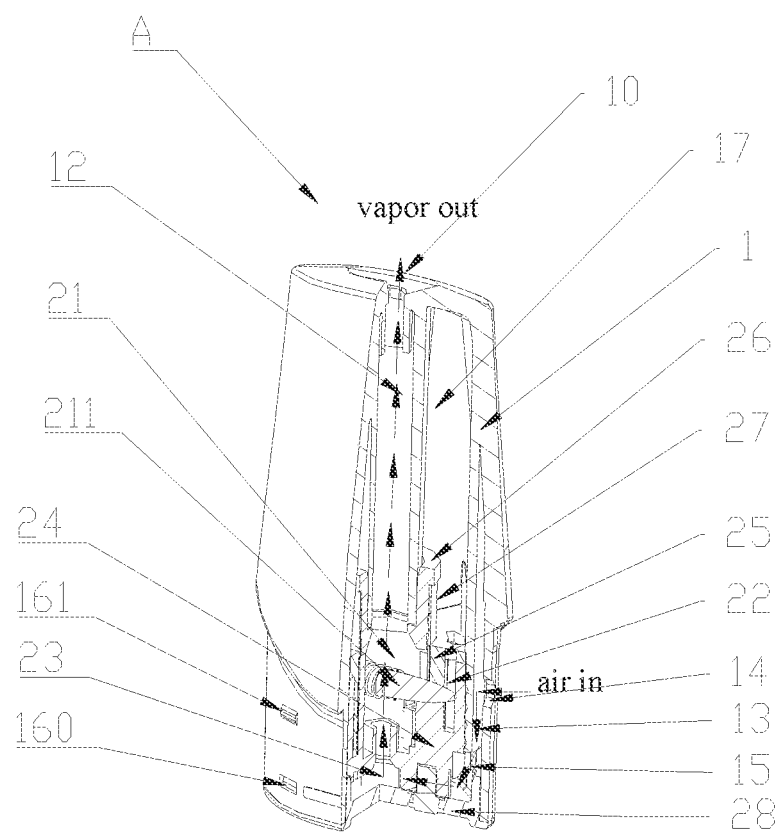
FIG. 7 is a partial perspective sectional view of the vaporizer of the embodiment of the present invention.
Figure 8:
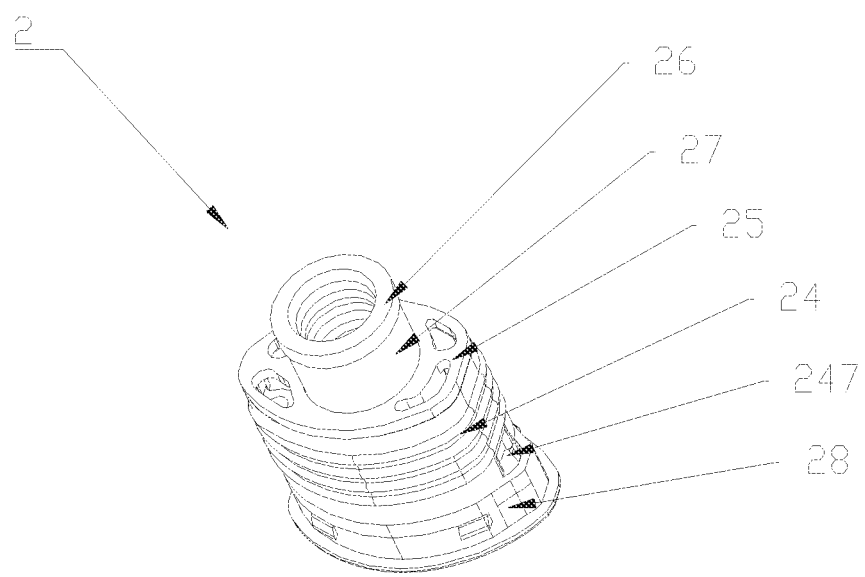
FIG. 8 is a perspective structural view of a vaporizing device of the embodiment of the present invention.
Figure 9:
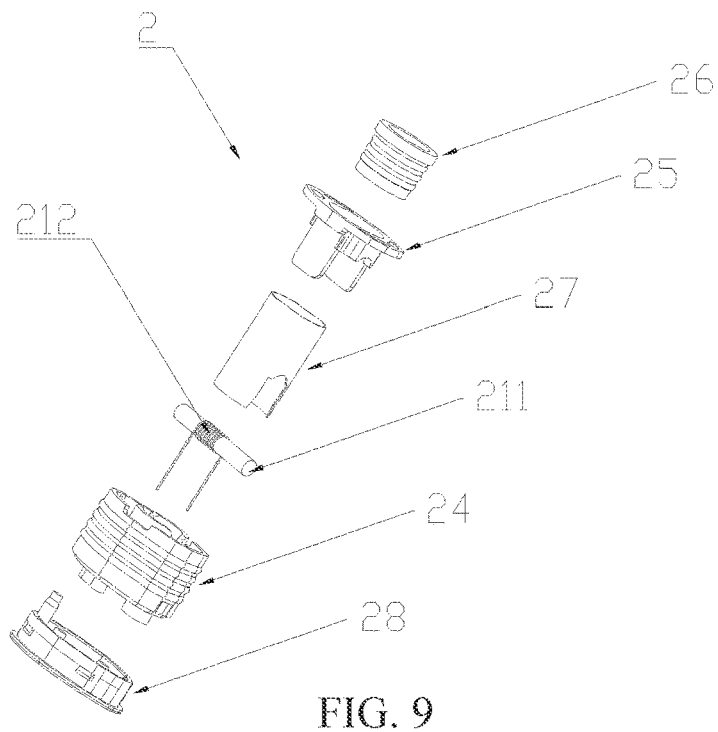
FIG. 9 is an exploded view of the vaporizing device of the embodiment of the present invention.
Figure 10:
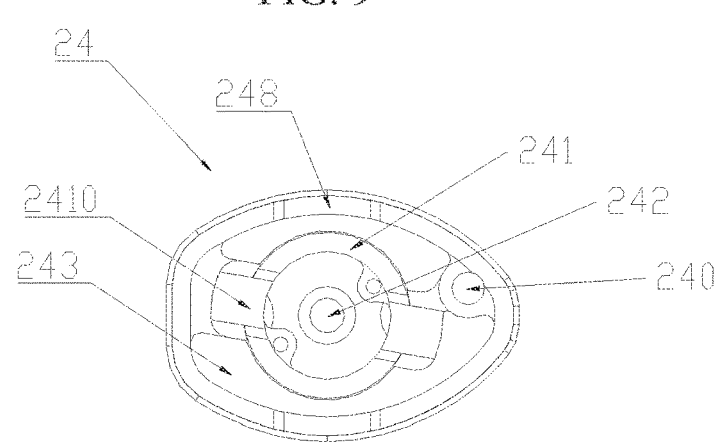
FIG. 10 is a top view of a vaporizing base of the embodiment of the present invention.

As shown in FIGS. 7 to 9, the vaporizing device 2 further comprises a vaporizing base 24, a throttle lid 25, a sealing sleeve 26, a connecting sleeve 27 and an electrode base 28. An outer wall of the vaporizing base 24 suitably abuts against the inner wall of the lower portion of the housing 1.

As shown in FIGS. 10 to 13, in the present embodiment of the present disclosures, a cylinder 241 extending downward is arranged at the center of the vaporizing base 24, a fourth air inlet 242 is provided at the bottom of the cylinder 241, an annular cavity 243 surrounds the cylinder 241, and a pair of grooves 2410 for suspending the liquid guiding strip 211 extending downward are symmetrically provided at an upper end of the wall of the cylinder 241. The grooves 2410 of the cylinder 241 are in U-shaped. U-shaped grooves 2410 is easy to receive the liquid guiding strip 211 wholly and leave a smallest gap, thereby preventing the e-cigarette liquid from leaking out from the gap. A step 2430 for placing the liquid guiding strip 211 extending from the bottom of the groove 2410 towards the annular cavity 243 is arranged, and the step 2430 also has a U-shaped groove. In such a way, the grooves 2410 are transversely prolonged so that area of the surface contacting the liquid guiding strip 211 increases, thereby further preventing the e-cigarette liquid from leaking out from the gap between the liquid guiding strip 211 and the grooves 2410. Positioning notches 248 are provided at an end surface of the outer periphery of the vaporizing base 24. Two protruding columns 246 are arranged at the bottom 245 of the vaporizing base 24, and lower end surfaces of the protruding columns 246 abut against a bottom plate 280 of the electrode base to be described below. Chambers 2460 for accommodating first positive and negative electrodes 281 are formed in the centers of the protruding columns 246. A third air inlet 247 is inwardly recessed into the lower end of the outer wall of the vaporizing base 24 at a position facing the second air inlet 15. The vaporizing base 24 is made of soft material such as silica gel, and a plurality of protruding rings 249 of the vaporizing base surrounding the outer wall of the vaporizing base 24 are arranged to increase sealing performance.

As shown in FIGS. 8, and 15-18, the throttle lid 25 fits over the upper end surface 244 of the vaporizing base 24. The throttle lid 25 is provided with a center hole 251, and throttle orifices 252 are provided around the center hole 251. The center hole 251 is in communication with the cylinder 241 of the vaporizing base, while the throttle orifices 252 are in communication with the annular cavity 243 of the vaporizing base. A sealing plate 253 for sealing the grooves 2410 of the cylinder extending vertically downward along the wall of the center hole 251 is arranged at the throttle lid 25 at a position corresponding to the step 2430. Upper grooves 2530 are provided at the bottom end surface of the sealing plate 253 and correspond to the positions where the liquid guiding strip 211 is placed. The sealing plate 253 and the step 2430 are vertically aligned with each other, such that the upper grooves 2530 and the grooves of the step 2430 form a closed circular opening only allowing the liquid guiding strip 211 to extend. Positioning protrusions 254 suitably abutting against the positioning notches 248 extending downward are disposed at the throttle lid 25 at positions corresponding to the positioning notches 248. The positioning protrusions 254 and the positioning notches 248 are fitted to each other, so as to fix the position of the throttle lid 25 and avoid displacement of the throttle lid 25. Side plates 255 adjacent to inner sides of the positioning protrusions 254 extending downward from the wall of the center hole 251 are arranged and insert into the annular cavity 243. Since the vaporizing base 24 is made of soft and high-temperature resistant material such as silica gel, the outer wall of the vaporizing base 24 is easy to tilt inward. In this case, the side plates 255 may support the outer wall of the vaporizing base 24.

As shown in FIGS. 5-9 and 19-20, the sealing sleeve 26 tightly abuts against the outer wall and the end surface of the lower portion of the vapor outlet tube 12. A bottom of the sealing sleeve 26 is provided with a bottom hole 261, such that the vapor outlet tube 12 is in communication with the vaporizing chamber 21. A lower end surface of the sealing sleeve 26 abuts against an upper end surface of the wall of the cylinder 241. The sealing sleeve 26 can seal up the liquid storage chamber 17, the vapor outlet tube 12 and the vaporizing chamber 21. In the embodiment of the present disclosures, the sealing sleeve 26 is made of soft and high-temperature resistant material such as silica gel, and a plurality of protruding rings 260 of the sealing sleeve surrounding the inner wall or the outer wall of the sealing sleeve 26 are disposed to increase sealing performance.

As shown in FIGS. 5-9 and 21, an upper inner wall of the connecting sleeve 27 is tightly sleeved at the outer wall of the sealing sleeve 26, a lower outer wall of the connecting sleeve 27 is tightly sleeved in an inner wall of the center hole 251 of the throttle lid 25, and a lower inner wall of the connecting sleeve 27 is tightly sleeved at an outer wall of the cylinder 241. The wall of the connecting sleeve 27 is provided with inverted U-shaped notches 270 at positions corresponding to the grooves placing the liquid guiding strip 211, through which the liquid guiding strip 211 can extend. The sealing sleeve 26 and the cylinder 241 of the vaporizing base are vertically aligned with each other and sleeved in the inner wall of the connecting sleeve 27. The lower outer wall of the connecting sleeve 27 is sleeved in the center hole 251 and the side plates 255 of the throttle lid 25. As the vaporizing base 24 and the sealing sleeve 26 are made of soft material and are easy to be softened or to move, in this case, the connecting sleeve can connect or support the vaporizing base 24 and the sealing sleeve 26. In the embodiment of the present disclosures, the connecting sleeve 27 is made of metal material. Owing to superior heat conduction and dissipation performance of the metal material, when the electronic cigarette is working, the heat accumulated in the cylinder 241 and the sealing sleeve 26 can be conducted and dissipated to other parts, e.g. e-cigarette liquid in the liquid storage chamber or the throttle lid, thus preventing the cylinder 241 and the sealing sleeve 26 from being burned due to overheating, that is, the connecting sleeve 27 has the function of heat conduction and dissipation.

Figure 22:
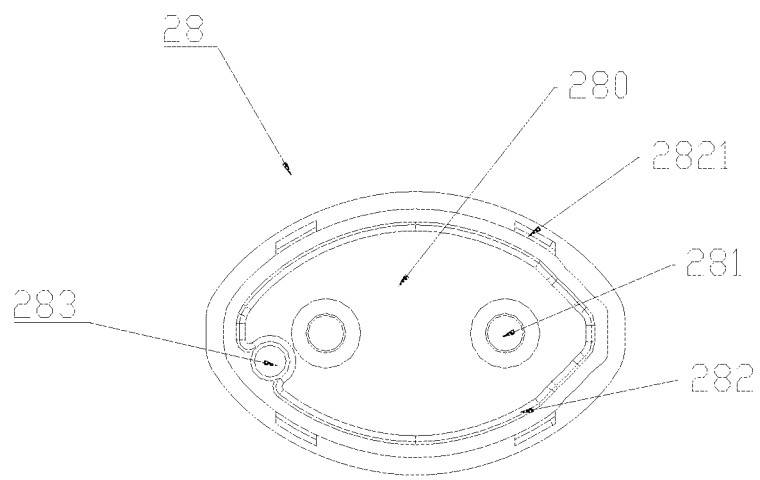
FIG. 22 is a top view of an electrode base of the embodiment of the present invention.
Figure 23:
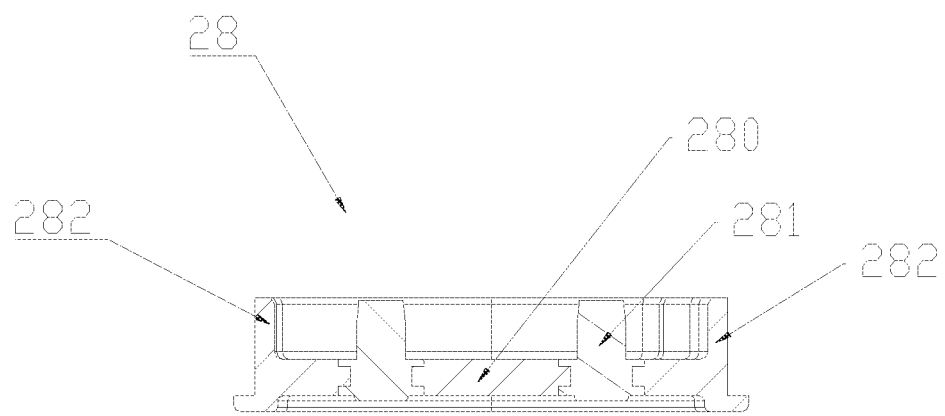
FIG. 23 is a sectional view of the electrode base of the embodiment of the present invention.
Figure 24:
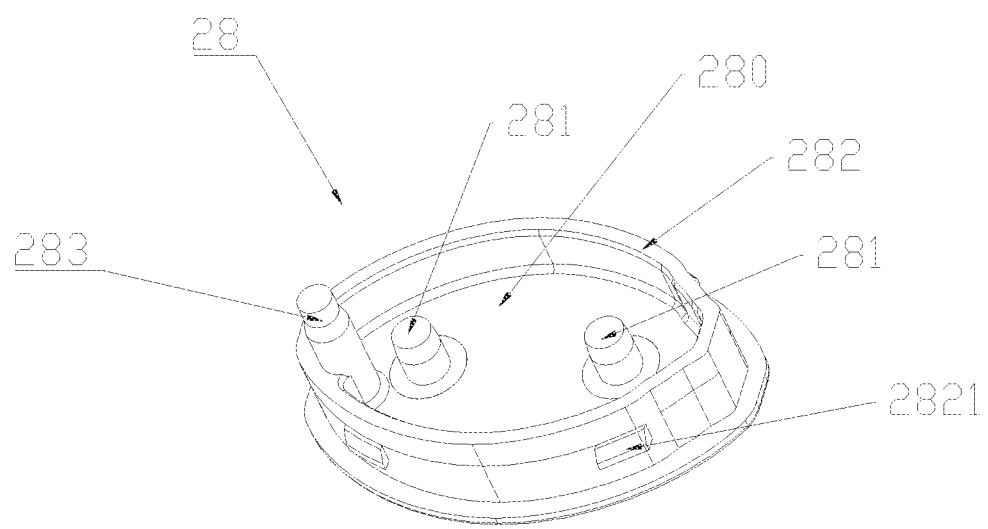
FIG. 24 is a perspective structural view of the electrode base of the embodiment of the present invention.

As shown in FIGS. 22-24, the electrode base 28 is provided with the bottom plate 280 whose shape is the same as the end surface of the opening end 11 of the housing 1. The first positive and negative electrodes 281 pass through the bottom plate 280, and a vertical wall 282 is vertically disposed around the bottom plate 280, wherein an upper end surface of the vertical wall 282 abuts against the bottom 245 of the vaporizing base 24.

Figure 6:
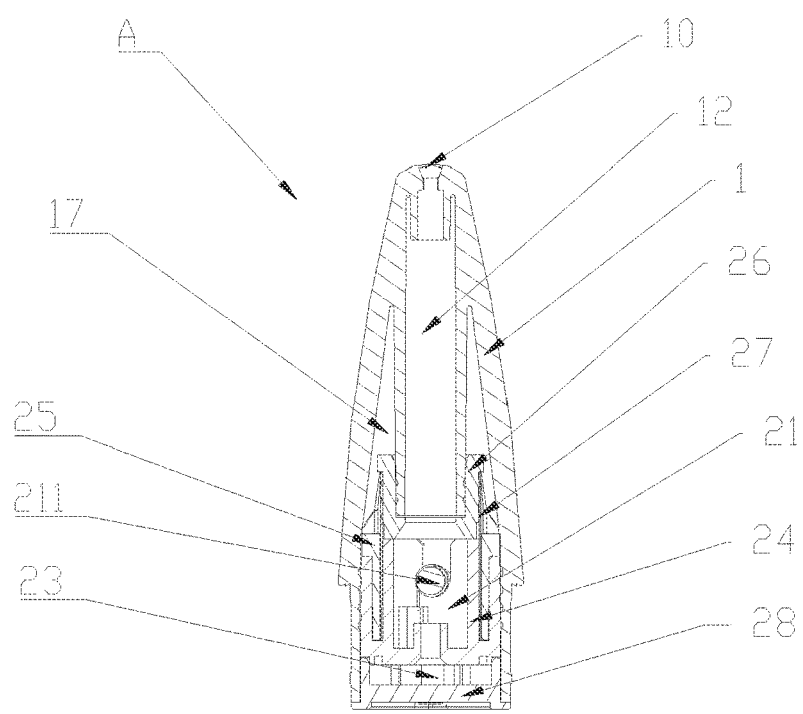
FIG. 6 is a sectional side view of the vaporizer of the embodiment of the present invention.

As shown in FIGS. 5 to 7, a vaporizing chamber 21 is defined between the bottom of the sealing sleeve 26, the inner wall of the connecting sleeve 27 and the cylinder 241 of the vaporizing base, a liquid absorbing chamber 22 is defined between the throttle lid 25 and the annular cavity 243 of the vaporizing base 24, and an air inlet chamber 23 is defined between the bottom plate 280 of the electrode base, the vertical wall 282 and the bottom 245 of the vaporizing base 24.

As shown in FIGS. 1, 2, and 5-7, the operation of the moisture-proof electronic cigarette according to the embodiment of the present disclosures is as follows: when the user inhales from the mouthpiece 10, negative pressure is generated in the vaporizing chamber 21, the e-cigarette liquid stored in the liquid storage chamber 17 flows into the liquid absorbing chamber 22, both ends of the liquid guiding strip 211 absorb the e-cigarette liquid in the liquid absorbing chamber 22, and the e-cigarette liquid is guided to the heating coil 212; with power supply, the heating coil 212 produces heat, then the e-cigarette liquid is vaporized and vapor of the e-cigarette is generated in the vaporizing chamber 21; at this time, due to the negative pressure generated in the vaporizing chamber 21, outer air enters in via an outer air inlet 303 and then flows through the first air inlet 14, the air inlet passage 13, the second air inlet 15, the third air inlet 247, the air inlet chamber 23, and the fourth air inlet 242, and flow into the vaporizing chamber 21; then the vapor of the e-cigarette can flow out by following the entered air through the vapor outlet tube 12 and then the mouthpiece 10, and is inhaled by the user. The above described flow directions of the air and the vapor are indicated by arrows as shown in the figures. When the user stops smoking, the residual vapor in the vaporizing chamber 21 is easy to flow back to the air inlet chamber 23 via the fourth air inlet 242, the air inlet chamber 23 has sufficient space for the water droplets or moisture in the vapor to be condensed on the inner wall of the air inlet chamber 23, such a structure prevents the water droplets or moisture from flowing back into the receiving opening 30, thus avoiding damage to the second positive and negative electrodes and internal circuits within the receiving opening 30 of the battery assembly B caused by the moisture.

Figure 11:
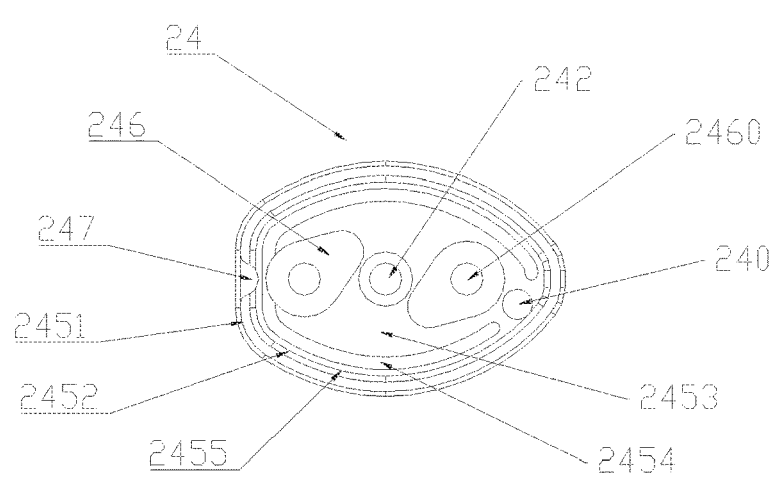
FIG. 11 is a bottom view of the vaporizing base of the embodiment of the present invention.
Figure 12:
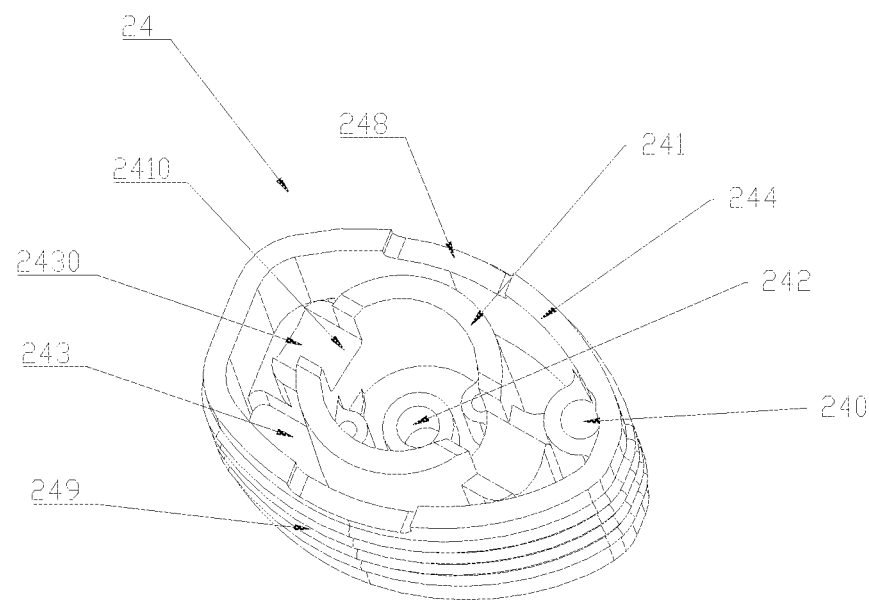
FIG. 12 is a perspective structural view of the vaporizing base of the embodiment of the present invention.
Figure 13:
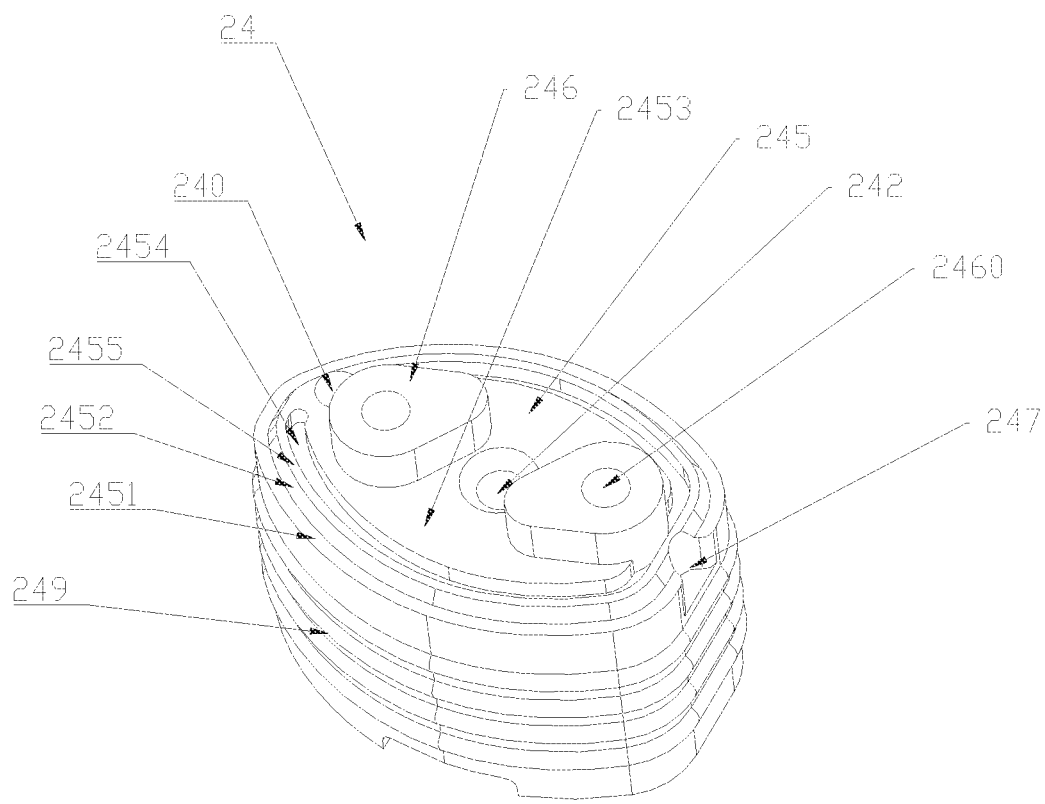
FIG. 13 is a perspective structural view of the vaporizing base of the embodiment of the present invention, wherein the bottom of the vaporizing base is upside down.
Figure 14:
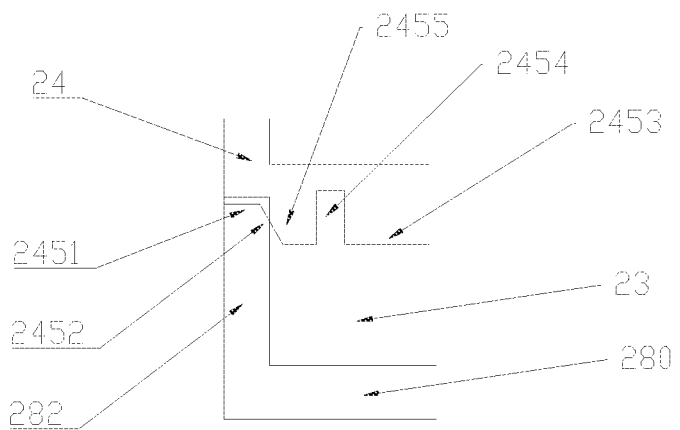
FIG. 14 is an enlarged view of a part where a bottom of vaporizing base and a vertical wall of the electrode base are connected of the embodiment of the present invention.
Figure 15:
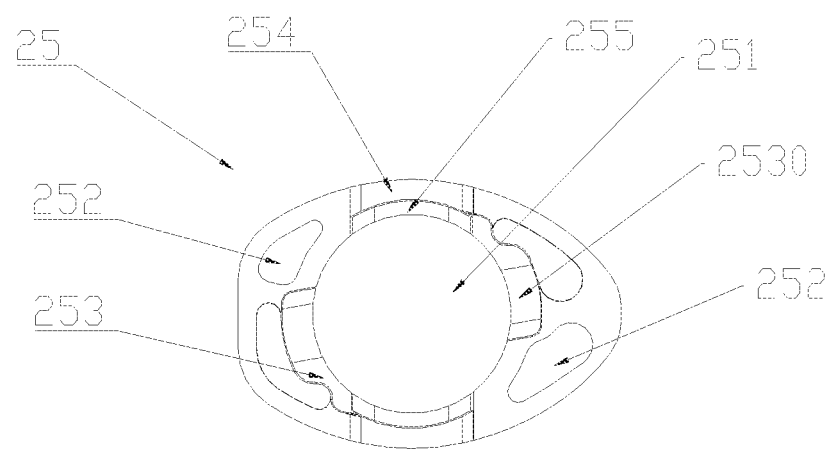
FIG. 15 is a bottom view of a throttle lid of the embodiment of the present invention.
Figure 16:
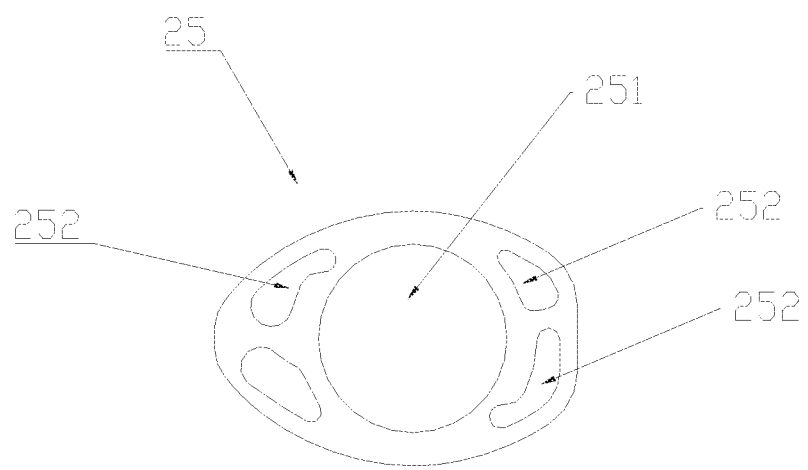
FIG. 16 is a top view of the throttle lid of the embodiment of the present invention.
Figure 17:
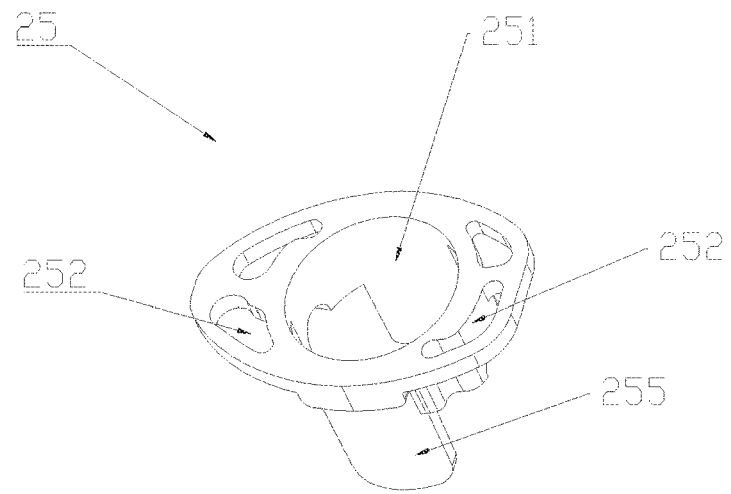
FIG. 17 is a perspective structural view of the throttle lid of the embodiment of the present invention.
Figure 18:
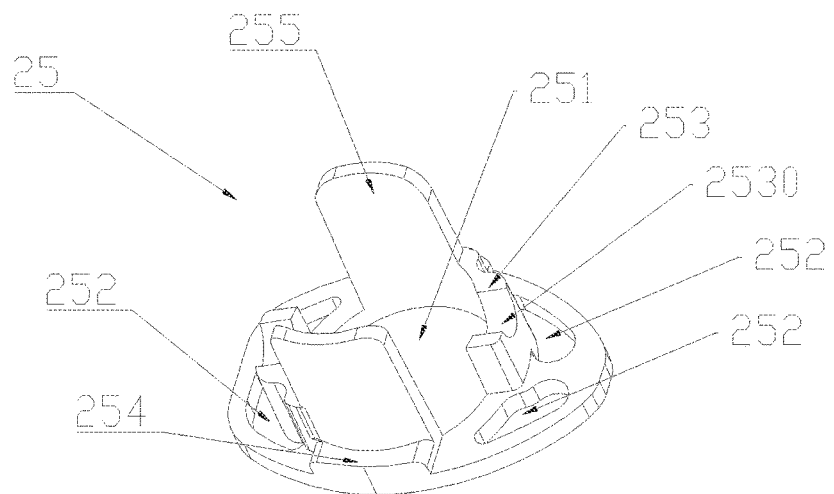
FIG. 18 is a perspective structural view of the throttle lid of the embodiment of the present invention, wherein the bottom of the throttle lid is upside down.
Figure 19:
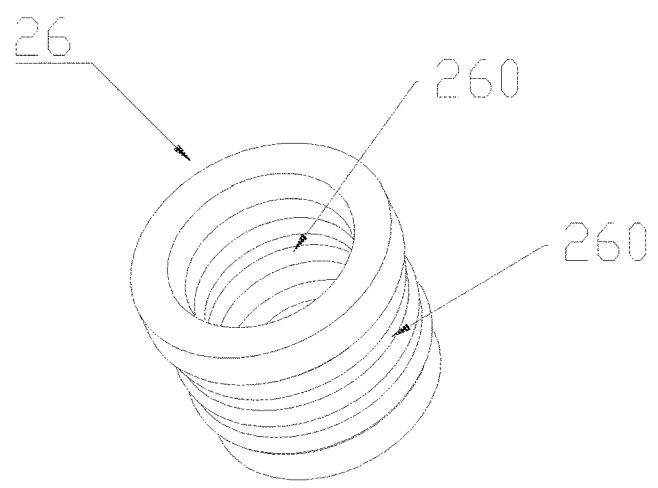
FIG. 19 is a perspective view of a sealing sleeve of the embodiment of the present invention.
Figure 20:
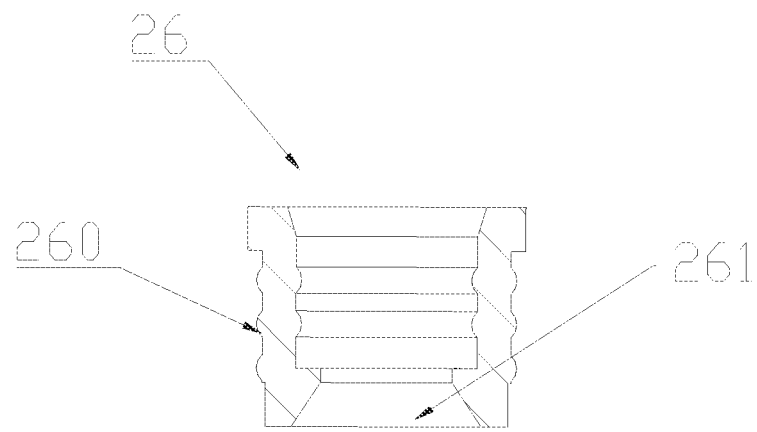
FIG. 20 is a sectional view of the sealing sleeve of the embodiment of the present invention.
Figure 21:
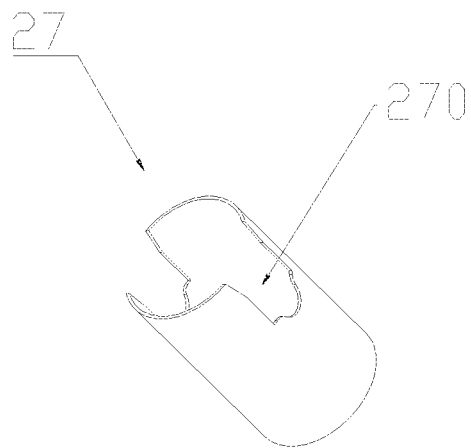
FIG. 21 is a perspective view of a connecting sleeve of the embodiment of the present invention.

As shown in FIGS. 11, 13 and 14, the bottom 245 of the vaporizing base 24 is provided with an annular contacting surface 2451 at a position connecting with the upper end surface of the vertical wall 282. A platform 2453 protrudes downwardly from the inner side of the annular contacting surface 2451. A transitional slope 2452 is formed between the surface of the platform 2453 and the annular contacting surface 2451. The platform 2453 and the transitional slope 2452 are configured for restricting displacement of the vertical wall 282 of the electrode base, thus avoiding a gap. Also, the upper end surface of the vertical wall 282 of the electrode base tightly presses against the transitional slope 2452, thus reaching a better sealing performance. An annular groove 2454 is further provided on the platform 2453 at an inner side adjacent to the transitional slope 2452. A trapezoidal protruding ring 2455 is formed between the annular groove 2454 and the annular contacting surface 2451. Therefore, the transitional slope 2452 has a better elastic effect, and the sealing performance is further increased, thus preventing the moisture from leaking out of the air inlet chamber and flowing into the receiving opening 30 of the battery assembly B.

As shown in FIGS. 11, 13 and 22-24, a liquid refilling hole 240 is further provided at the bottom of the vaporizing base 24, and a plunger 283 is arranged at the bottom plate 280 of the electrode base at a position corresponding to the liquid refilling hole 240. The plunger 283 is configured for being inserted into the liquid refilling hole 240 and blocking the liquid refilling hole 240. The design of the liquid refilling hole 240 and the plunger 283 makes it possible that after assembly of other parts of the vaporizer A is completed, the e-cigarette liquid can be refilled into the liquid storage chamber 17 in the final step, that is, before assembling the electrode base 28, thereby facilitating the assembly and improving production efficiency, also avoiding leakage of e-cigarette liquid during production.

As shown in FIGS. 3, 4, 7, and 24, first male snaps 2821 are formed on the outer side of the vertical wall 282 of the electrode base, and first snap-in holes 160 correspondingly snap-fitted to the first male snaps 2821 are formed on the inner wall of the plug-in section 16. In such a way, the electrode base 28 can be conveniently mounted and fixed in the housing 1.

As shown in FIGS. 1, 2 and 7, the outer wall of the plug-in section 16 is provided with second male snaps 161, and the inner wall of the receiving opening 30 of the battery assembly B is provided with second snap-in holes 302 correspondingly snap-fitted to the second male snaps 161. The plug-in section 16 and the receiving opening 30 are connected through plugging and snapping, in such a way, the vaporizer A and the battery assembly B can be firmly assembled, or can be easily and conveniently disassembled.

As shown in FIGS. 1 and 2, the first air inlet 14 is disposed on a side wall of the plug-in section 16, and an outer wall of the receiving opening 30 of the battery assembly B is provided with the outer air inlet 303 at a position corresponding to the first air inlet 14.

As shown in FIGS. 1 to 7, the cross section of the housing 1 is oval-shaped and gradually increases from top to bottom, such structure with a smaller upper portion and a bigger lower portion facilitates keeping the mouthpiece 10 in the mouth of the user. Such oval-shaped structure makes it possible to provide a bigger space for storing more e-cigarette liquid and containing the vaporizing device 2 in the housing 1, and the shape doesn't look too big. In order to match the shape of the housing of the vaporizer and reach overall consistency, the cross section of the battery assembly B is oval-shaped as well.

All the above are merely preferred embodiments of the present disclosures, which are not intended to limit the present disclosures in any form. The present disclosures is intended to cover all changes, various modifications and equivalent arrangements those skilled in the art can make according to the technical essence of the present disclosures.

The invention claimed is:

1. A moisture-proof electronic cigarette (e-cigarette) comprising a detachably connected vaporizer and battery assembly, wherein the vaporizer comprises a housing and a vaporizing device;

wherein a mouthpiece is arranged in a center of an upper end surface of the housing, and a lower end of the housing is an opening end; a vapor outlet tube extending inside the housing from the mouthpiece is arranged; at least one air inlet passage is formed inside a wall of the housing in an upward direction from the opening end; a first air inlet is provided on an outer wall of the housing and is in communication with an upper portion of the air inlet passage, while a second air inlet is provided on the inner wall of the housing and is in communication with a lower portion of the air inlet passage; the diameter of a section of the outer wall of the housing adjacent to the opening end decreases to form a plug-in section; one end of the battery assembly is provided with a receiving opening for accommodating and receiving the plug-in section;

wherein the vaporizing device is disposed in the housing at one side where the opening end is formed; a vaporizing chamber is formed in the center of the vaporizing device, and a liquid absorbing chamber surrounds the vaporizing chamber; an air inlet chamber is formed at the bottom of the vaporizing device; a liquid storage chamber for storing the e-cigarette liquid is defined between the inner wall of the housing, an outer wall of the vapor outlet tube and an upper side of the vaporizing device; the liquid storage chamber is in communication with the liquid absorbing chamber; an upper part of the vaporizing chamber is in communication with the vapor outlet tube, while a lower part of the vaporizing chamber is in communication with the air inlet chamber; the air inlet chamber is in communication with the air inlet passage through the second air inlet; the liquid storage chamber and the liquid absorbing chamber are both isolated and sealed from the vapor outlet tube, the vaporizing chamber, the air inlet chamber and the air inlet passage;

wherein a liquid guiding strip is suspendedly disposed inside the vaporizing chamber, and a heating coil is wound around the middle of the liquid guiding strip; both ends of the liquid guiding strip stretch into the liquid absorbing chamber; the e-cigarette liquid in the liquid absorbing chamber is absorbed by the liquid guiding strip and guided to the heating coil to be heated and vaporized, thus producing vapor of the e-cigarette in the vaporizing chamber;

wherein first positive and negative electrodes isolated from the air inlet chamber are arranged at the bottom of the vaporizing device; when the plug-in section is plugged in the receiving opening of the battery assembly, the first positive and negative electrodes and second positive and negative electrodes in the receiving opening of the battery assembly respectively abut against each other and electric connection is therefore achieved.

2. The moisture-proof electronic cigarette according to claim 1, wherein the vaporizing device further comprises a vaporizing base, a throttle lid, a sealing sleeve, a connecting sleeve and an electrode base; an outer wall of the vaporizing base suitably abuts against the inner wall of the lower portion of the housing; a cylinder extending downward is arranged at the center of the vaporizing base, a fourth air inlet is provided at the bottom of the cylinder, an annular cavity surrounds the cylinder, and a pair of grooves for suspending the liquid guiding strip extending downward are symmetrically provided at an upper end of the wall of the cylinder; the throttle lid fits over the upper end surface of the vaporizing base; the throttle lid is provided with a center hole, and throttle orifices are provided around the center hole; the center hole is in communication with the cylinder, while the throttle orifices are in communication with the annular cavity of the vaporizing base; the sealing sleeve tightly abuts against the outer wall and the end surface of the lower portion of the vapor outlet tube; a lower end surface of the sealing sleeve abuts against an upper end surface of the wall of the cylinder; an upper inner wall of the connecting sleeve is tightly sleeved at the outer wall of the sealing sleeve, a lower outer wall of the connecting sleeve is tightly sleeved in an inner wall of the center hole of the throttle lid, and a lower inner wall of the connecting sleeve is tightly sleeved at an outer wall of the cylinder; the wall of the connecting sleeve is provided with inverted U-shaped notches at positions corresponding to the grooves placing the liquid guiding strip, through which the liquid guiding strip can extend; the electrode base is provided with a bottom plate whose shape is the same as the end surface of the opening end of the housing; the first positive and negative electrodes pass through the bottom plate, and a vertical wall is vertically disposed around the bottom plate, wherein the vertical wall abuts against the bottom of the vaporizing base; two protruding columns are arranged at the bottom of the vaporizing base, and lower end surfaces of the protruding columns abut against the bottom plate of the electrode base; chambers for accommodating the first positive and negative electrodes are formed in the centers of the protruding columns; the vaporizing chamber is defined between the bottom of the sealing sleeve, the inner wall of the cylinder and the bottom of the cylinder, a liquid absorbing chamber is defined between the throttle lid and the annular cavity of the vaporizing base, and the air inlet chamber is defined between the bottom plate of the electrode base, the vertical wall of the electrode base and the bottom of the vaporizing base; a third air inlet is inwardly recessed into the lower end of the outer wall of the vaporizing base at a position facing the second air inlet, wherein the third air inlet is in communication with the air inlet chamber.

3. The moisture-proof electronic cigarette according to claim 2, wherein the grooves of the cylinder are in U-shaped; a step for placing the liquid guiding strip extending from the bottom of the groove towards the annular cavity is arranged; positioning notches are provided at an end surface of the outer periphery of the vaporizing base; a sealing plate for sealing the grooves of the cylinder extending vertically downward along the wall of the center hole is arranged at the throttle lid at a position corresponding to the step; Upper grooves are provided at the bottom end surface of the sealing plate and correspond to the positions where the liquid guiding strip is placed, allowing the liquid guiding strip to extend; positioning protrusions suitably abutting against the positioning notches extending downward are disposed at the throttle lid at positions corresponding to the positioning notches; side plates adjacent to inner sides of the positioning protrusions extending downward from the wall of the center hole are arranged and insert into the annular cavity.

4. The moisture-proof electronic cigarette according to claim 2, wherein the bottom of the vaporizing base is provided with an annular contacting surface at a position connecting with the upper end surface of the vertical wall; a platform protrudes downwardly from the inner side of the annular contacting surface; a transitional slope is formed between the surface of the platform and the annular contacting surface; the upper end surface of the vertical wall of the electrode base tightly presses against the transitional slope; an annular groove is further provided on the platform at an inner side adjacent to the transitional slope; a trapezoidal protruding ring is formed between the annular groove and the annular contacting surface.

5. The moisture-proof electronic cigarette according to claim 2, wherein the vaporizing base is made of soft material, and a plurality of protruding rings of the vaporizing base surrounding the outer wall of the vaporizing base are arranged to increase sealing performance;

the sealing sleeve is made of soft and high-temperature resistant material, and a plurality of protruding rings of the sealing sleeve surrounding the inner wall or the outer wall of the sealing sleeve are disposed to increase sealing performance.

6. The moisture-proof electronic cigarette according to claim 2, wherein a liquid refilling hole is further provided at the bottom of the vaporizing base, and a plunger is arranged at the bottom plate of the electrode base at a position corresponding to the liquid refilling hole, and the plunger is configured for being inserted into the liquid refilling hole and blocking the liquid refilling hole.

7. The moisture-proof electronic cigarette according to claim 1, wherein first male snaps are formed on the outer side of the vertical wall of the electrode base, while first snap-in holes correspondingly snap-fitted to the first male snaps are formed on the inner wall of the plug-in section.

8. The moisture-proof electronic cigarette according to claim 7, wherein second male snaps are formed on the outer wall of the plug-in section, while second snap-in holes are formed on the inner wall of the receiving opening of the battery assembly correspondingly snap-fitted to the second male snaps.

9. The moisture-proof electronic cigarette according to claim 1, wherein the first air inlet is disposed on a side wall of the plug-in section, and an outer wall of the receiving opening of the battery assembly is provided with the outer air inlet at a position corresponding to the first air inlet.

10. The moisture-proof electronic cigarette according to claim 1, wherein the cross section of the housing is oval-shaped and gradually increases from top to bottom, and the cross section of the battery assembly is oval-shaped as well.

11. The moisture-proof electronic cigarette according to claim 2, wherein the cross section of the housing is oval-shaped and gradually increases from top to bottom, and the cross section of the battery assembly is oval-shaped as well.

12. The moisture-proof electronic cigarette according to claim 3, wherein the cross section of the housing is oval-shaped and gradually increases from top to bottom, and the cross section of the battery assembly is oval-shaped as well.

13. The moisture-proof electronic cigarette according to claim 4, wherein the cross section of the housing is oval-shaped and gradually increases from top to bottom, and the cross section of the battery assembly is oval-shaped as well.

14. The moisture-proof electronic cigarette according to claim 5, wherein the cross section of the housing is oval-shaped and gradually increases from top to bottom, and the cross section of the battery assembly is oval-shaped as well.

15. The moisture-proof electronic cigarette according to claim 6, wherein the cross section of the housing is oval-shaped and gradually increases from top to bottom, and the cross section of the battery assembly is oval-shaped as well.

16. The moisture-proof electronic cigarette according to claim 7, wherein the cross section of the housing is oval-shaped and gradually increases from top to bottom, and the cross section of the battery assembly is oval-shaped as well.

17. The moisture-proof electronic cigarette according to claim 8, wherein the cross section of the housing is oval-shaped and gradually increases from top to bottom, and the cross section of the battery assembly is oval-shaped as well.

18. The moisture-proof electronic cigarette according to claim 9, wherein the cross section of the housing is oval-shaped and gradually increases from top to bottom, and the cross section of the battery assembly is oval-shaped as well.

* * * * *